United States Patent [19]

Gehrke et al.

[11] 4,210,413
[45] Jul. 1, 1980

[54] TRANSFER PRINTING PROCESS

[75] Inventors: Günter Gehrke, Cologne; Walter Hohmann, Leverkusen, both of Fed. Rep. of Germany

[73] Assignee: Bayer Aktiengesellschaft, Leverkusen, Fed. Rep. of Germany

[21] Appl. No.: 891,843

[22] Filed: Mar. 30, 1978

[30] Foreign Application Priority Data

Apr. 2, 1977 [DE] Fed. Rep. of Germany ....... 2714768

[51] Int. Cl.$^2$ ............................................. D06P 5/06
[52] U.S. Cl. ........................................... 8/471; 8/675; 260/380
[58] Field of Search ............... 8/2.5 A, 39 C; 260/380

[56] References Cited
U.S. PATENT DOCUMENTS 3,164,615 1/1965 Buecheler ............................ 260/380

FOREIGN PATENT DOCUMENTS 2238399 2/1974 Fed. Rep. of Germany .
1391012 4/1975 United Kingdom .

OTHER PUBLICATIONS

Color Index, 2 (1971), pp. 2479-2480.
Transfer Printing Manual, Reichman, National Knitted Outerwear Assoc., (1976), pp. 55-58.

Primary Examiner—Stanford M. Levin
Attorney, Agent, or Firm—Sprung, Felfe, Horn, Lynch & Kramer

[57] ABSTRACT

Fabrics of synthetic fibres, preferably polyester fibres, can be printed in clear blue shades in accordance with the transfer printing principle if dyestuffs of the formula

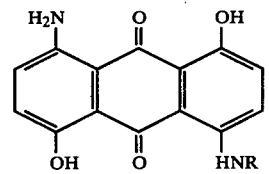

wherein R represents an alkyl radical with 2-6 C-atoms, are used.

1 Claim, No Drawings

TRANSFER PRINTING PROCESS

The present invention relates to a process for printing sheet-like structures, consisting of synthetic or partially synthetic polymeric materials, in accordance with the transfer printing principle, which is characterised in that dyestuffs of the formula

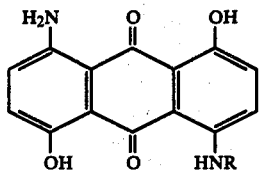

wherein

R represents an alkyl radical with 2-6 C atoms, are used.

Preferred dyestuffs to be used are those of the formula I which contain an alkyl radical which is branched at the α-carbon atom, that is to say those in which R represents, for example, an isopropyl, sec.-butyl, tert.-butyl, 1-methyl-butyl, 1-ethyl-propyl, tert.-pentyl, 1,2-dimethyl-propyl, 1-methyl-pentyl, 1,1-dimethyl-butyl, 1,2-dimethyl-butyl, 1-methyl-1-ethyl-propyl or 1,2,2-trimethyl-propyl radical.

The invention further relates to printing inks and printing pastes for transfer printing, the temporary supports printed or impregnated with dyestuffs of this type, and the substrates which have been dyed with dyestuffs of this type in accordance with the transfer printing principle.

The dyestuffs of the formula I to be used according to the invention are known or are accessible by customary methods. However, they have hitherto only been used for other purposes.

The transfer printing process is generally known (compare, for example, Colour Index, 3rd edition, Volume 2, page 2,480). In this process, so-called temporary supports, which are printed with suitable printing inks, are brought into close contact with the substrate to be printed, whereupon the dyestuff is transferred from the support onto the substrate, under the action of heat and optionally of pressure.

Temporary supports which can be used are sheet-like structures, such as paper, Cellophane, cotton fabric, linen fabric, metal foils and the like. Paper is preferred.

The printing inks can be printed by customary printing processes (relief printing, planographic printing, gravure printing or screen/film printing).

The composition of the printing inks depends on the nature of the substrate, of the printing process and of the support and on other factors. In general, they consist of (a) a dyestuff of the formula I, (b) a binder, (c) a solvent, (d) optionally a thickener, (e) optionally fillers and (f) optionally a dispersing agent.

Binders which can be used are, depending on the printing process, products which dry chemically and-/or physically, such as are customarily used in textile or paper printing.

Thickeners which can be used are, above all, those products which already cause a significant increase in viscosity at a low concentration.

Suitable dispersing agents are non-ionic compounds, such as alkyl polyglycol ethers and alkylphenol polyglycol ethers, as well as anionic compounds, such as naphthalenesulphonic acid/formaldehyde condensation products, ligninsulphonates and sulphite waste liquor products. The nature of the solvents depends very greatly on the nature of the printing process.

Particularly suitable printing processes for the preparation of printed paper temporary supports are gravure printing and rotary screen printing.

Suitable substrates are, preferably, sheet-like structures, such as non-woven fabrics, felts, furs, films and, above all, fabrics consisting of synthetic or partially synthetic material, in particular of aromatic polyesters.

Further suitable substrates are cellulose fibres which have been partially modified chemically and cellulose materials which have been impregnated with crosslinking agents and pre-dried.

Clear blue prints with good fastness properties in use, for example good fastness to light, are obtained on these substrates by the process claimed, especially with the dyestuffs containing branched alkyl radicals, which are preferably to be used.

EXAMPLE 1

(A) 75 g of 4-isopropylamino-8-amino-1,5-dihydroxy-anthraquinone, 50 g of an anionic dispersing agent, for example a lignin-sulphonate or a condensation product of naphthalenesulphonic acid and formaldehyde, and 100 ml of water are mixed and converted into a finely dispersed form by grinding for 10 hours in a ball mill.

The dispersion thus obtained, containing about 30% of crude dye, is stable to storage.

(B) The aqueous dispersion obtained according to (A) can be processed to a printing paste as follows.

50–200 g are made into a paste with 400 g of a 10% strength carob bean flour ether thickener and 550–400 ml of water.

(C) A paper is printed with this printing paste by the gravure printing process. If this paper is pressed together with a textile consisting of polyester fibres for 15–60 seconds at 200° C., a strong blue print is obtained.

EXAMPLE 2

(A) 50 g of 4-sec.-butylamino-8-amino-1,5-dihydroxy-anthraquinone are made into a paste with 5–10 g of an emulsifier mixture consisting of ethoxylated nonylphenol (4–12 mols of ethylene oxide) in water. 10 g of ethylcellulose N 4 (Hercules Powder) and 30–40 parts of a maleate resin, which has been prepared by a condensation reaction of colophonium with maleic acid, are added. The mixture is kneaded at 80°–100° C. for about 2 hours and then ground on one of the customary mills. A fine-particled dyestuff powder is obtained.

(B) 200 g of the dyestuff powder obtained according to (A) are added to a mixture of 730 g of ethanol, 50 g of ethylene glycol and 20 g of ethylcellulose N 22 (Hercules Powder), whilst stirring.

(C) Papers can be printed by gravure printing with the printing ink thus obtained. Textiles consisting of cellulose triacetate, for example knitted fabrics, can be printed from these printed papers by the transfer process and strong blue prints are obtained.

EXAMPLE 3

75 g of 4-tert.-butylamino-8-amino-1,5-dihydroxyanthraquinone are finely dispersed in a ball mill, together with 50 g of a condensation product of naphthalenesulphonic acid and formaldehyde and 100 g of water. The dyestuff dispersion thus obtained is stirred into a thickener which of 21 parts of water, 7 parts of diacetonealcohol, 41.3 parts of Microdol ® extra (natural calcium magnesium carbonate), 0.2 part of sodium hexametaphosphate, 0.5 part of a naphthalenesulphonic acid/formaldehyde condensation product, 8 parts of 3% strength Bentone ® EW (swellable clay) and 12 parts of Acrylate Binder DA (50% strength solution of the ammonium salt of a polyacrylate in 33% strength aqueous ethyl alcohol. The polyacrylate is a copolymer consisting of 60% of acrylic acid ethyl ester, 25% of metacrylic acid ethyl ester and 15% of acrylic acid).

This printing paste is printed onto a temporary support, preferably paper with a weight per square meter of about 60–80 g/cm² and a Cobb$_{60}$ value of about 80, using screen-printing stencils or rotary stencils. A smooth print is obtained.

Textiles consisting of polyester can be printed with the paper thus prepared, by bringing the textile into contact with the paper for 15–60 seconds and heating the two to temperatures of 190°–200° C. A blue transfer with good fastness properties in use is obtained. In addition to the abovementioned dyestuffs, the compounds listed in the Table below are also outstandingly suitable for the process according to the invention:

Table

Dyestuffs of the formula 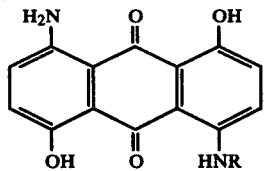

| No. | R | Colour shade |
|---|---|---|
| 1 | ethyl | blue |
| 2 | propyl | " |
| 3 | butyl | " |
| 4 | 2-methyl-propyl | " |

Table-continued

Dyestuffs of the formula 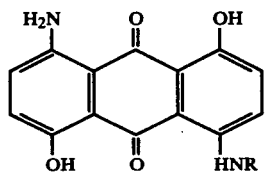

| No. | R | Colour shade |
|---|---|---|
| 5 | pentyl | " |
| 6 | 1-methyl-butyl | " |
| 7 | 1-ethyl-propyl | " |
| 8 | 2-methyl-butyl | " |
| 9 | 1,1-dimethyl-propyl | " |
| 10 | 1,2-dimethyl-propyl | " |
| 11 | 3-methyl-butyl | " |
| 12 | 2,3-dimethyl-propyl | " |
| 13 | hexyl | " |
| 14 | 1-methyl-pentyl | " |
| 15 | 1-ethyl-butyl | " |
| 16 | 2-methyl-pentyl | " |
| 17 | 1,1-dimethyl-butyl | " |
| 18 | 1,3-dimethyl-butyl | " |
| 19 | 4-methyl-pentyl | " |
| 20 | 3-methyl-pentyl | " |
| 21 | 1,2-dimethyl-butyl | " |
| 22 | 1-methyl-1-ethyl-propyl | " |
| 23 | 2-ethyl-butyl | " |
| 24 | 2,2-dimethyl-butyl | " |
| 25 | 1,2,3-trimethyl-propyl | " |
| 26 | 3,3-dimethyl-butyl | " |
| 27 | 1,1,2-trimethyl-propyl | " |

We claim:

1. In the process of transfer printing in which a temporary support is printed with a sublimable dyestuff and the dyestuff is transferred by heat from the temporary support to a substrate, the improvement comprising using as the dyestuff a dyestuff of the formula in which
R is isopropyl.

* * * * *